United States Patent [19]

Holden

[11] Patent Number: 4,464,150

[45] Date of Patent: Aug. 7, 1984

[54] COMPOSITE ACTION PULLEY

[76] Inventor: Clifford A. Holden, 29 W. Glen Rd., Rock Ridge Lake, Denville, N.J. 07834

[21] Appl. No.: 429,022

[22] Filed: Sep. 30, 1982

Related U.S. Application Data

[62] Division of Ser. No. 168,573, Jul. 14, 1980, abandoned.

[51] Int. Cl.³ ............................................. F16H 55/40
[52] U.S. Cl. .................................. 474/195; 29/159 R; 301/80; 474/902
[58] Field of Search ............... 474/184, 190, 195, 196, 474/197, 902, 903; 29/159 R, 455 R; 301/79, 80, 3 CS, 6 CS, 7, 104

[56] References Cited

U.S. PATENT DOCUMENTS

| | | | |
|---|---|---|---|
| 232,635 | 10/1880 | Fetter | 474/903 X |
| 1,642,989 | 9/1927 | Busch | 474/190 |
| 1,748,473 | 2/1930 | Fisk | 193/37 X |
| 2,572,276 | 10/1951 | Moe | 193/37 |
| 2,736,205 | 2/1956 | Dunne | 198/835 X |
| 2,763,158 | 9/1956 | Firth | 198/842 X |
| 2,767,590 | 10/1956 | Currier | 198/835 X |
| 2,886,156 | 5/1981 | Halbron | 193/37 |
| 3,046,805 | 7/1962 | Van Gorp | 29/159 |
| 3,055,229 | 9/1962 | Mecham | 474/185 X |
| 3,134,268 | 5/1964 | Firth | 474/197 |
| 3,140,621 | 7/1964 | Stone | 474/197 X |
| 3,217,554 | 11/1965 | Stalker | 474/197 X |
| 3,267,758 | 8/1966 | Poundstone | 474/197 X |
| 3,711,912 | 1/1973 | Teake et al. | 198/835 X |

Primary Examiner—Kenneth Dorner

[57] ABSTRACT

An inner rigid pulley core is formed from a plurality of plate members extending radially from a centrally disposed shaft; or a predetermined axis of rotation at which the plate members meet and are connected together in the absence of a shaft. A cylindrical pulley shell is secured to the free ends of the plate members to form with the rigid pulley core a pulley with a face which in total acts as a beam (composite type). In one of the embodiments, where the radial plates are secured to each other, about the predetermined axis of rotation, the axial ends of the plates are extended near the axis of rotation on each end of the pulley to form ears about which an annular ring is secured to form shaft ends to facilitate mounting of the pulley. In another embodiment (where the plates are secured together about the axis of rotation) a cast end bell with stub shaft ends is secured to the pulley core and shell to facilitate mounting of the pulley. In yet another embodiment the rigid pulley core and shell are formed by casting concrete about a shaft having welding lugs radially extending therefrom along a predetermined extent of the shaft length, and reinforcing bars or plates are disposed proximate the periphery thereof.

2 Claims, 9 Drawing Figures

COMPOSITE ACTION PULLEY

This application is a division, of application Ser. No. 168,573, filed July 14, 1980, now abandoned.

BACKGROUND OF THE INVENTION

1. Field of Application

This invention relates to pulleys; and more particularly to pulleys for use with conveyor belts.

2. Description of the Prior Art

Pulleys, and especially conveyor belt pulleys constituting the drive or tail pulleys of conveyor belt systems, are subject to many stresses and strains, and a good deal of unsupported bending moments. All of the stresses, strains and bending moments create fatigue in the pulley and many pulleys, currently available on the market for use in belt conveyors, fail during use because the disk or end plate cracks in fatigue and the cylindrical pulley face cracks in fatigue a short distance from where it is welded to the pulley disk.

Some conveyor belt pulleys, such as those shown in U.S. Pat. No. 2,763,158 granted to D. Firth on Sept. 18, 1956 for Conveyor Pulley, and in U.S. Pat. No. 3,134,268 granted on May 26, 1964 to D. Firth for Pulley and Hub Construction, utilize a cylindrical outer shell with radial end walls welded to the outer shell, and hub means to secure the pulley to the shaft by way of connections to the radial end walls. Pulleys of this construction quite often fail in use due to the aformentioned stresses, strains and bending.

Other conveyor pulleys, wherein the end walls are not welded to the cylindrical pulley shell, such as shown in U.S. Pat. No. 2,736,205 granted on Feb. 28, 1956 to M. F. Dunne, Jr. for Pulley and Method of Making Same, in U.S. Pat. No. 3,140,621 granted on July 14, 1964 to G. B. Stone for Pulley Hub with Crowned Outer Face, and in U.S. Pat. No. 3,267,758 granted on Aug. 23, 1966 to W. N. Poundstone for Idler Rollers and Method of Making Same, have resulted in much more highly complex constructions without relieving the failure problems to any appreciable extent. Even such complex fabrications as shown in U.S. Pat. No. 2,767,590 granted on Oct. 23, 1956 to D. C. Currier for Conveyor Pulleys, in U.S. Pat. No. 3,217,554 granted on Nov. 16, 1965 to K. W. Stalkes for Universal Pulley, and in U.S. Pat. No. 3,055,229 granted on Sept. 25, 1962 to F. J. Mecham for Self Cleaning Conveyor Belt Pulley have not resulted in a reliable conveyor belt pulley.

Furthermore pulleys of solid construction, such as shown in U.S. Pat. No. 1,642,989 granted on Sept. 20, 1927 to H. F. Busch for Compressed Core Article and Method of Making Same, and in U.S. Pat. No. 3,711,912 granted on Jan. 23, 1973 to F. Teake et al. for Support Roller for Conveyor Belts and the Like, also fail to provide a beam like composite action pulley.

SUMMARY OF THE INVENTION

It is therefore an object of this invention to provide a new and improved pulley.

It is another object of this invention to provide a new and improved conveyor belt pulley.

It is yet another object of this invention to provide a composite action pulley.

It is yet still another object of this invention to provide a new and improved pulley wherein the outer face of the pulley acts as part of a beam.

It is still a further object of this invention to provide a composite action conveyor belt pulley wherein the outer face of the pulley acts as the outer flange of a beam.

This invention involves a composite action conveyor belt pulley; and contemplates forming same with a rigid pulley core and outer belt contacting surface formed by casting concrete about a shaft having radial lugs extending therefrom, or with a rigid pulley core formed of longitudinally disposed radially extending plates encased in a cylindrical pulley shell.

The outer drum acts as a beam flange and works in conjunction with the shaft; thus utilizing the concept of composite action. The beam shear is carried by the web members, be they steel fins or solid concrete. In concrete composite action pulleys the longitudinal shear is transmitted thru the concrete drum by shear connectors (Nelson Welding Studs or equal).

Other objects, features, and advantages of the invention in its details of construction and arrangement of parts will be seen from the above, from the following description of the preferred embodiments when considered with the drawings and from the appended claims.

DESCRIPTION OF THE PREFERRED EMBODIMENTS

For convenience the invention, in some of its embodiments will be described as applied to a belt conveyor pulley with its core formed by six longitudinally disposed radially extending steel plates and its belt contacting surface formed by a cylindrical steel shell welded to the free end of the radial plates; and in another of its embodiments as applied to a belt conveyor pulley formed by casting concrete in cylindrical outer configuration about a shaft with radially extending lugs disposed along its length. It should be understood, nevertheless that without departing from the scope of this invention that the plates and outer cylindrical shells can be other then steel and that the cast configuration can use material other then concrete. The materials depending upon the application and intended end uses of the composite pulley.

Figure 1:
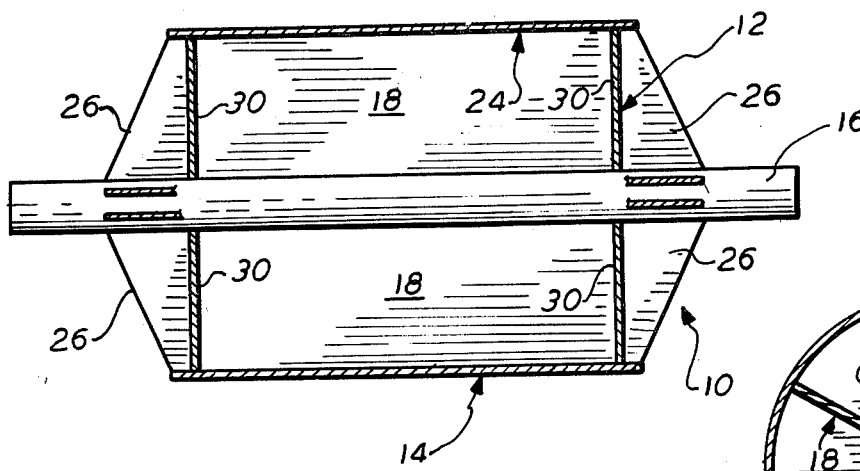
FIG. 1 is a longitudinal section through a composite pulley incorporating the instant invention.
Figure 2:
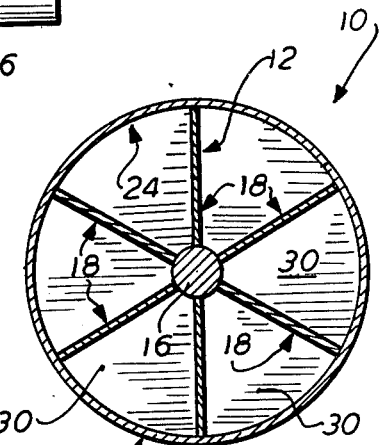
FIG. 2 is a transverse cross-section of the composite pulley of FIG. 1.

With reference to FIG. 1 there is generally shown at 10 a composite pulley having a rigid pulley core 12 and an outer cylindrical shell 14 carried by a pulley shaft 16. Pulley core 12 includes a plurality of rigid core plates 18 each having, their inner ends secured to shaft 16 by welding and, their outer ends secured to the inner surface 24 of outer cylindrical shell as by welding. Plates 18 are longitudinally disposed along shaft 16 and extend radially out therefrom into contact with the inner surface of outer shell 14. Each plate 18 includes a triangular shaped end portion 26 at each longitudinal end thereof.

A plurality of end panels 30 are disposed between each set of radial plates 18 proximate each end thereof. Each end panel 30 is secured in place by welding.

The composite pulley thus formed has a rigid inner core supporting its outer cylindrical pulley surface in such a manner that the outer face of the pulley in total acts as a beam.

Figure 3:
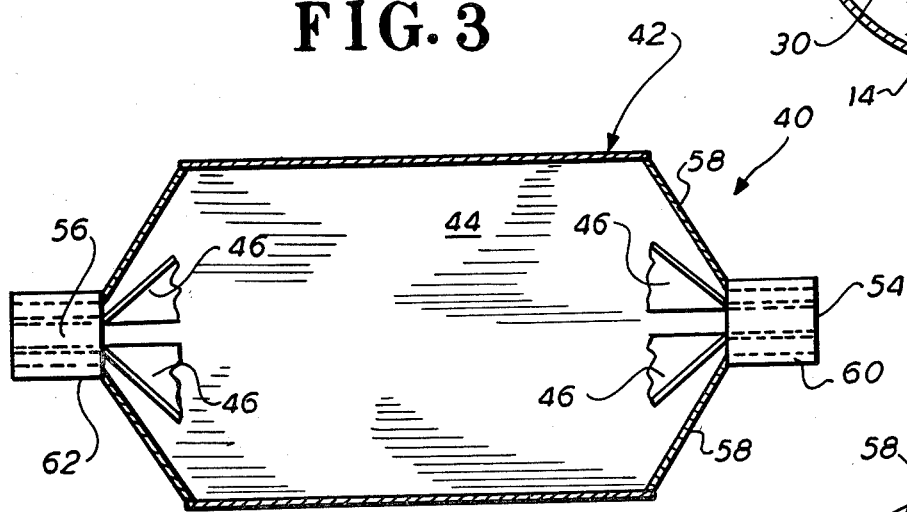
FIG. 3 is a longitudinal section through a composite pulley of modified construction.
Figure 4:
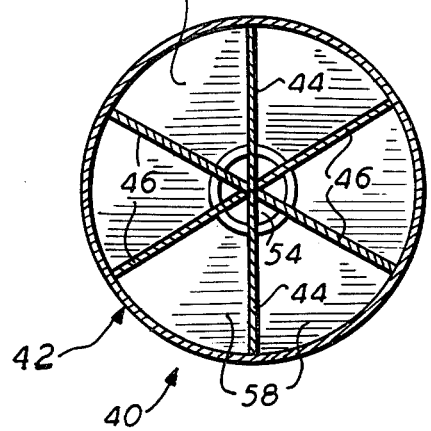
FIG. 4 is a transverse cross-section of the composite pulley of FIG. 3.
Figure 5:
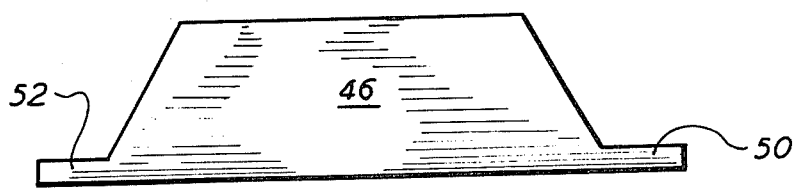
FIG. 5 is a plan view of a radial plate of the composite pulley of FIGS. 3 and 4.

In the embodiment of FIGS. 3–5 a composite pulley 40 is formed with an outer pulley shell 42 welded in position to the free ends of radial core plates 44,46. The rigid inner core includes a main core plate 44 extending diametrically across the entire pulley. A plurality of radial core plates 46 extend longitudinally with and radially from plate 44 and are welded thereto along a predetermined longitudinal axis of rotation.

Each core plate 46 is formed at each of its respective longitudinal ends with ears 50,52 (FIG. 5). Main plate 44 is formed with similar ears 54,56 which together with ears 50, 52 mount and are secured to cylindrical end rings 60, 62 to facilitate mounting of pulley 40. A plurality of end plates or end panels 58 are disposed between each pair of plates 44–46, 46—46, at each end of pulley 40 and are secured in place as by welding.

The construction of pulley 40 is thus similar to pulley 10 in that it is composite and in that its outer face in total acts as a beam.

Figure 6:
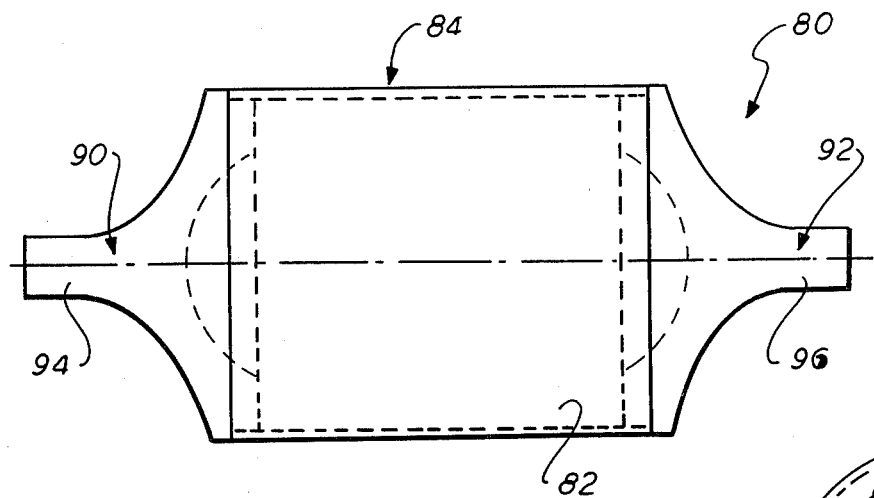
FIG. 6 is a plan view of yet another embodiment of a composite pulley.
Figure 7:
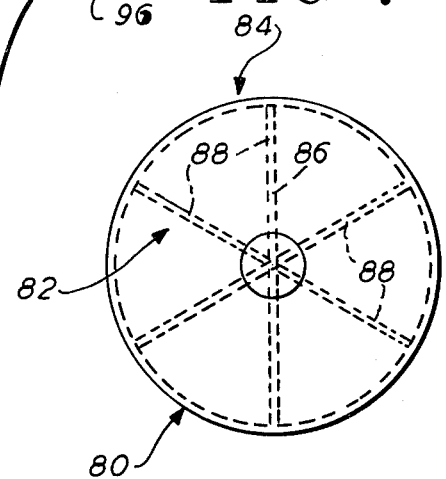
FIG. 7 is an end view of the composite pulley of FIG. 6.

In FIGS. 6 and 7 there is shown a further embodiment of a composite action pulley 80 including a rigid inner pulley core 82 and a cylindrical outer pulley shell 84.

The rigid inner core 82 is made up from a diametric main plate 86 to which a plurality of longitudinally disposed and radially extending core plates 88 are welded to form the rigid inner core. Outer cylindrical shell 84 is welded in position about the free ends of plates 86,88. An end bell 90, 92 is secured, as by welding to each longitudinal end of core 84. A shaft end 94,96 is formed on each end bell to facilitate mounting pulley 80.

Pulley 80, like pulleys 10 and 40, is a composite action pulley with its outer face, in total, acting as a beam.

Figure 8:
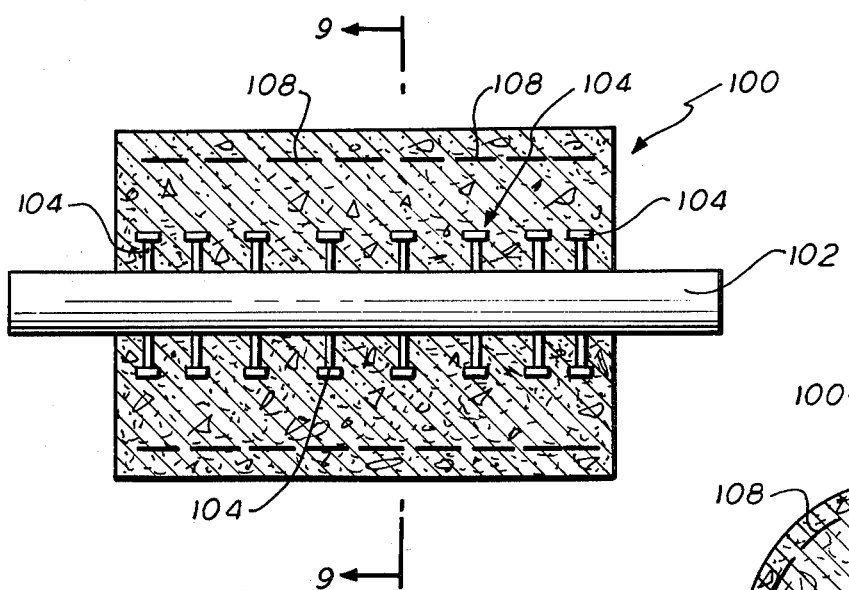
FIG. 8 is a longitudinal section through yet another embodiment of the composite pulley.
Figure 9:
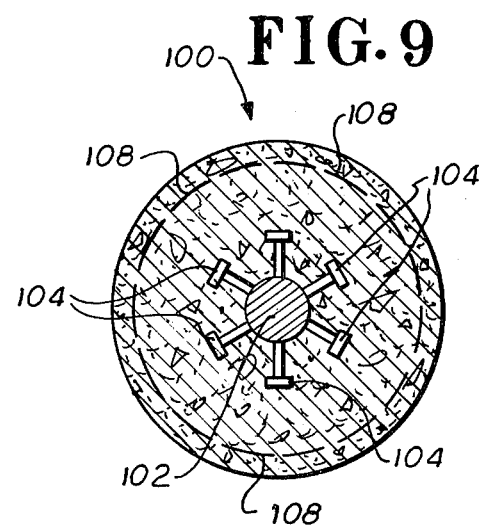
FIG. 9 is a transverse cross-section of the composite pulley of FIG. 8.

In the embodiment of FIGS. 8 and 9 there is shown a composite action pulley 100 having a centrally disposed pulley shaft 102. A plurality of lugs 104, formed from suitable members, such as Nelson Welding Studs, are disposed longitudinally along and so as to extend radially from shaft 102.

Shaft 102, with its lugs 104, is disposed in a suitable mold and concrete of appropriate mixture is poured thereabout and allowed to harden.

A reinforcing mesh 108 (such as used to reinforce concrete when poured in construction situations) is positioned to form a cylindrical reinforcing structure concentric with the pulley shaft 102. Mesh 108 may otherwise be discrete seperate elements or full rings.

Here again the composite action pulley 100 so formed includes an outer pulley face which in total acts as a beam.

From the above description it will thus be seen that there has been provided a novel and improved composite action pulley.

It is understood that although I have shown the preferred form of my invention that various modifications may be made in the details thereof without departing from the spirit as comprehended by the following claims.

I claim:

1. A composite action pulley; comprising:
   (a) a plurality of core plates secured together so as to longitudinally extend a substantial length along a predetermined axis of rotation and so as to be radially extending from said predetermined axis of rotation;
   (b) free ends of said core plates describing a cylindrical configuration of predetermined diameter;
   (c) said core plates including
      (i) a diametrically disposed main core plate longitudinally bisected by said predetermined axis of rotation; and
      (ii) a plurality of additional core plates longitudinally secured to said main core plate along said predetermined axis of rotation and radially extending from said main core plate so that said free ends of said main core plate and said additional core plates describe said predetermined cylindrical configuration;
   (d) a cylindrical shell, having an inner diameter proximating said predetermined diameter, disposed about and secured to said free ends of said core plates;
   (e) shaft means extending along said predetermined axis of rotation and secured to said core plates to facilitate mounting of the composite action pulley;
   (f) each core plate at each longitudinal end thereof proximate said predetermined axis of rotation including a longitudinally extending ear of predetermined axial extent; and
   (g) a cylindrical ring disposed about said ears to form said shaft means;
   (h) said shell being secured in total to act as a beam.

2. The composite action pulley of claim 1 including a plurality of end plates; each such end plate being secured between opposed sides of adjacent core plates.

* * * * *